March 8, 1938.  D. C. PRINCE  2,110,676

ELECTRORESPONSIVE DEVICE

Filed Nov. 21, 1936

Inventor:
David C. Prince,
by Harry E. Dunham
His Attorney.

Patented Mar. 8, 1938

2,110,676

UNITED STATES PATENT OFFICE

2,110,676

ELECTRORESPONSIVE DEVICE

David C. Prince, Swarthmore, Pa., assignor to General Electric Company, a corporation of New York Application November 21, 1936, Serial No. 112,067

20 Claims. (Cl. 175—294)

My invention relates to improvements in electroresponsive devices, and more particularly to improvements in protective relays for polyphase alternating current electric systems. My invention in general relates to improvements in electroresponsive devices such as are disclosed and claimed in the copending application of V. E. Verrall, Serial No. 70,580, filed March 24, 1936, for Electroresponsive device, and assigned to the same assignee as this invention. An object of my invention is to provide an improved electroresponsive device which responds to a predetermined function of a plurality of groups of coexisting polyphase quantities.

In the manufacture of polyphase wattmetric devices, such as wattmeters and polyphase power directional relays, it has been customary to use two or more electric current conducting rotors, such as disks, for example, on a single shaft with one or more separate electromagnetic means to each rotor for producing a torque thereon. Such devices, because of their size, require a relatively large space and switchboard area. Moreover, they have low efficiency and high inertia, and therefore do not meet present day protective relay requirements for high torque and speed.

In accordance with my invention, I provide an improved electroresponsive device which is compact and simple in construction and which provides a high torque and fast operation. Furthermore, in accordance with my invention, I provide an electroresponsive device in which only one electric current conducting rotor is actuated by a plurality of co-operating fluxes from a plurality of poles so energized from a plurality of groups of coexisting polyphase electric quantities as to eliminate undesired torque effects and thereby provide a resultant torque which is, for example, a function of the magnitudes of and the phase displacements between certain quantities of the groups of coexisting polyphase quantities. Thus, if the quantities of one group are the currents of a three-phase system and the quantities of another group are the voltages of the system, a resultant polyphase directional torque proportional to a component of the power of the system can be obtained. These and other objects of my invention will appear in more detail hereinafter.

My invention will be better understood from the following description when considered in connection with the accompanying drawing, and its scope will be pointed out in the appended claims.

Figure 1:
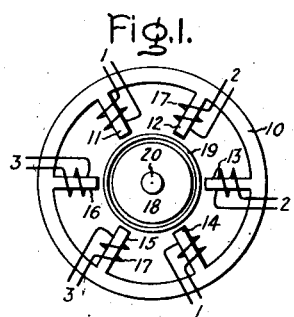
Figure 2:
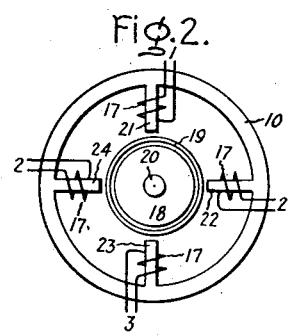
Figure 3:
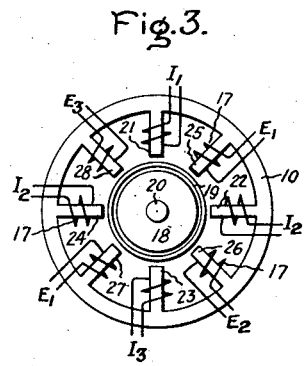
Figure 4:
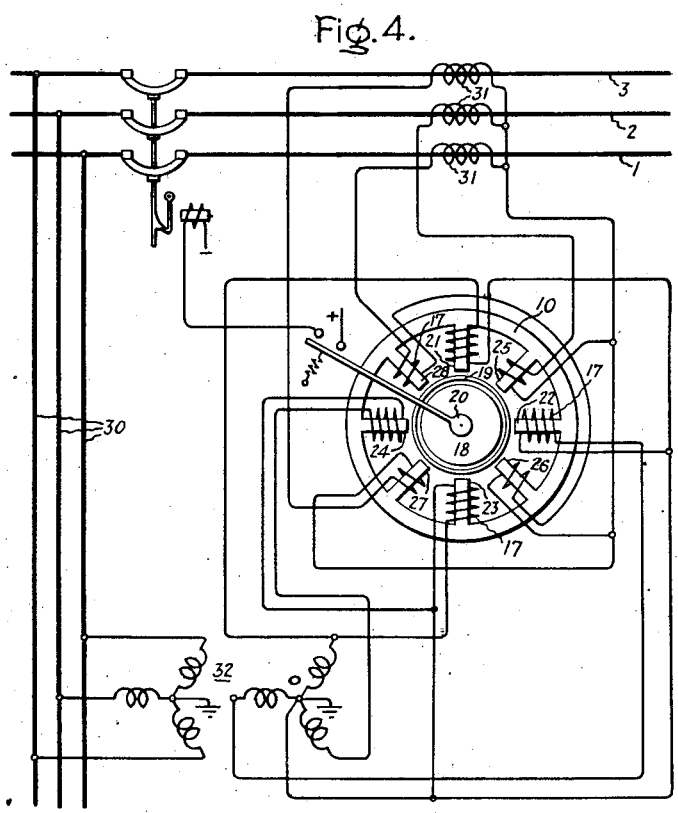
Figure 5:
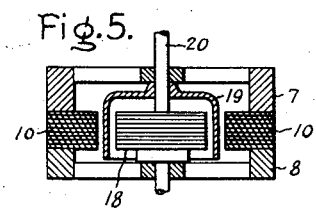

In the accompanying drawing, Fig. 1 illustrates diagrammatically an embodiment of my invention with a winding arrangement for eliminating undesired torque effects; Fig. 2 illustrates diagrammatically a modification of my invention for eliminating undesired torque effects with a more simple construction; Fig. 3 illustrates an embodiment of my invention for obtaining a torque dependent upon a predetermined function of the electric quantities of two coexisting groups of polyphase quantities without undesired torque effects; Fig. 4 illustrates diagrammatically one way in which the embodiment of my invention shown in Fig. 3 may be connected to a polyphase system to provide a torque dependent upon a component of the system power; and Fig. 5 is a schematic diametrical cross-section typical of the embodiments of my invention illustrated in Figs. 1–4.

The embodiment of my invention shown in Fig. 1 comprises a hollow magnetic member 10 illustrated as having a plurality of radially disposed inwardly extending salients 11–16, inclusive, each provided with an energizing winding 17, a central magnetic member or stator 18, and a cylindrical rotor 19 providing an electric current conducting path concentrically disposed relatively to the ends of the salients and to the stator so as to be rotatable in the gaps between the stator and the salients. With this arrangement, it will be apparent that the magnetic structure provides relatively low reluctance magnetic circuits between adjacent salients although not as low between alternate salients. The rotor 19 may be mounted on a shaft 20 indicated as extending through the stator and movable relatively thereto. As pointed out in the Verrall application referred to herein, the stator and rotor may be combined so as to rotate together. Although such an arrangement increases the torque efficiency, the inertia is increased in greater proportion and consequently the device is not so fast in operation.

Assuming, for example, that the windings 17 on the salients 11–16, inclusive, are energized by a set of three phase currents, for example, the currents 1, 2, 3 in the phase conductors of a three phase circuit in the cyclic order 1, 2, 2, 1, 3, 3, as indicated by the numbers at the ends of the respective windings 17, then the rotating field produced by the windings 17 on the salients 11, 13, 15 is opposite in direction to the rotating field produced by the windings 17 on the three salients, 12, 14, 16. Other things being equal, the resultant torque is zero and the rotor 19 is not actuated. However, if it were desired to produce a resultant torque dependent for example on a component of the power flow of an a—c system, then six more salients energized by the system voltages could be used. This, however, makes an unnecessarily large number of poles, as will be shown in connection with the embodiment of my invention illustrated in Figs. 2, 3, and 4.

Referring now to Fig. 2, the hollow magnetic member 10 has four salients, 21, 22, 23, 24, for a three-phase system of electric quantities or in general $2(n-1)$ salients for an $n$-phase system. If it be assumed that the windings 17 on the salients 21, 22, 23, 24, are energized by the phase currents 1, 2, 3 of a three phase system in the cyclic order 1, 2, 3, 2, as indicated by the numbers at the ends of the respective windings, then the direction of the rotating field produced by the windings 17 on the salients 21, 22, 23 is opposite to the direction of the rotating field produced by the windings 17 on the salients 21, 24, 23. Other things being equal, the resultant torque is zero and the rotor 19 is not actuated. Similarly, if the windings 17 were energized in the same order by the star or the delta voltages of the system instead of the currents, there would be no torque on the rotor. If desired, this torque balance can readily be upset to produce rotation by de-energizing one of the windings 17. For example, the winding on the salient 22 or that on the salient 24.

Assume, however, that the magnetic member 10 has eight salients, 21, 22, 23, 24, and 25, 26, 27, 28, as shown in Fig. 3. Then if the windings 17 on the four alternate salients 21, 22, 23, 24 are energized by the three phase currents of a three-phase system in the order $I_1$, $I_2$, $I_3$, $I_2$ and the windings 17 on the intermediate salients 25, 26, 27, 28 are energized by three phase voltages of the system in the order $E_1$, $E_2$, $E_1$, $E_3$, as indicated by the letters at the ends of the windings, the resultant torque of each group of salients is zero. But obviously, the adjacent salients will produce a torque whose resultant is dependent on the product of the quantities energizing adjacent salients and the phase displacements of these quantities. In other words, the resultant torque will be proportional to $\Sigma EI \cos(\phi+\theta)$, where E and I represent respectively the current and the voltage of the circuit, $\phi$ the angle by which the current lags the voltage in the system, and $\theta$ is the angle of lead (current leading voltage) at which maximum torque occurs.

If the torque effects of the windings 17 on the salients 21, 22, 23, 24 were not balanced, and similarly for the torque effects of the windings 17 on the salients 25, 26, 27, 28, then the above expression for torque would be altered by the inclusion of both current and also voltage terms of the second order. Even though the alternate salients are farther apart than the adjacent salients, the reluctance of the magnetic circuit, including two alternate salients, is relatively low and the torque effect of the windings on the alternate salients due to such unbalance may easily be as much as 15% of the torque effect of the windings on two adjacent salients. In accordance with my invention, however, the balancing of the torque effects of the windings on the alternate salients eliminates these undesired torques so that the resultant torque is a true function of the products of the quantities energizing adjacent salients and the phase displacements of such quantities. It will be obvious to those skilled in the art that, in accordance with the principles of my invention, it is not necessary that one group of alternate salients be energized by the currents of a polyphase system and the other group by the voltages of the polyphase system, but that the two groups may be respectively energized by two coexisting groups of polyphase currents or polyphase voltages to obtain a torque which is, as before, a function of the products of the quantities energizing the adjacent salients and the phase angles between such quantities.

The illustrated orders of current and voltages are not the only arrangements for providing a resultant zero torque by groups of alternate salients. For example, instead of energizing alternate salient windings 17 by currents in the order $I_1$, $I_2$, $I_3$, $I_2$, they may be energized by currents in the order $-I_1$, $-I_2$, $I_3$, $I_2$, and similarly, instead of having the voltages in the order $E_1$, $E_2$, $E_1$, $E_3$, they may be in the order $-E_1$, $-E_2$, $E_1$, $E_3$, the minus sign indicating a reversal in the polarity of the connection.

In order more clearly to illustrate my invention, there is shown in Fig. 4 an embodiment of a three-phase system comprising a three-phase circuit whose phase conductors, designated 1, 2, and 3, for simplicity in phase order, may constitute a feeder extending from a station bus 30. The respective phase currents may be derived through current transformers 31 connected in the phase conductors and the voltages through a potential transformer 32 connected to the bus 30. In this figure, the current energized windings are shown on the diagonal salients 25, 26, 27, 28, and the voltage energized windings on the vertical and horizontal salients 21, 22, 23, 24. Thus, the windings on the salients 21, 22, 23, 24, as shown, are connected to be energized by the system star voltages $E_{10}$, $E_{20}$, $E_{10}$, $E_{30}$, respectively, and the resultant torque of the windings on these salients alone is nothing. Similarly the windings on the salients 28, 25, 26, 27 are energized in accordance with the system phase conductor currents $I_1$, $I_2$, $I_1$, $I_3$, respectively, and the resultant torque on the windings of these salients alone is nothing. Taking all of the windings together, the order of energization is $I_1$, $E_{10}$, $I_2$, $E_{20}$, $I_1$, $E_{10}$, $I_3$, $E_{30}$, and the resultant torque is consequently dependent on the summation of the products of the voltage and current quantities energizing the adjacent salients and a function of the phase angles between the quantities. This torque is then a polyphase directional torque proportional to a power component of the three-phase system.

Obviously, the salient windings 17 may be connected in other ways to provide a power directional torque which is free of terms of the second order in current or voltage. Examples of some of the other ways in which the salient windings may be connected are given in the following table, but this table is by no means intended to be exhaustive of the possible arrangements which can be evolved without departing from the spirit and scope of my invention. In this table, as before, E used with the sub numbers 10, 20, and 30 indicates star voltages, and with 12, 23, and 31 delta voltages, and the minus sign indicates a reversal in the polarity of the connection.

| Salient numbers | 28 | 21 | 25 | 22 | 26 | 23 | 27 | 24 |
|---|---|---|---|---|---|---|---|---|
| Arrangement | Electric quantities energizing windings | | | | | | | |
| A | $I_1$ | $E_{30}$ | $I_2$ | $-E_{10}$ | $I_1$ | $-E_{20}$ | $I_3$ | $E_{30}$ |
| B | $I_1$ | $E_{30}$ | $I_2$ | $-E_{20}$ | $I_1$ | $-E_{10}$ | $I_3$ | $E_{20}$ |
| C | $I_1$ | $E_{10}$ | $I_2$ | $-E_{20}$ | $I_1$ | $-E_{10}$ | $I_2$ | $E_{10}$ |
| D | $I_1$ | $E_{23}$ | $I_2$ | $-E_{12}$ | $I_1$ | $-E_{23}$ | $I_3$ | $E_{31}$ |
| E | $I_1$ | $E_{31}$ | $I_2$ | $-E_{23}$ | $I_1$ | $-E_{31}$ | $I_2$ | $E_{12}$ |
| F | $I_1$ | $E_{12}$ | $I_2$ | $-E_{31}$ | $I_1$ | $-E_{12}$ | $I_2$ | $E_{23}$ |

In each of the above arrangements, the torque effect of the current energized salients alone is zero. Likewise, the torque effect of the voltage energized salients is zero. But the resultant torque of all salients is a polyphase directional torque proportional to a power component of the system. Arrangement A provides the equivalent of the so-called quadrature connection used in multiple disk polyphase power directional relays. Arrangements B and C provide the equivalent of the so-called adjacent connections used in multiple disk polyphase relays. Arrangements such as A, B, C, and D may be used, for example, in relays for transmission line protective purposes. Arrangements such as E and F may find application, for example, in the tripping control of low voltage network protectors.

From the sectional view of Fig. 5, the general assembly of the parts of the electroresponsive device as disclosed in the Verrall application herein referred to will be obvious. Thus, the rotor 19, the shaft 20, the stator 18, and the magnetic member 10 with its windings 17, not shown in Fig. 5, are assembled and retained by two end plates 7 and 8. One of these is preferably of magnetic material, as disclosed in the copending application of E. H. Bancker, filed November 21, 1936, Serial No. 112,069 and assigned to the same assignee as this invention.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, a polyphase alternating current system and a relay comprising a single rotatable current conducting member, electromagnetic means for actuating said member in accordance with the magnitudes of and the phase displacements between the currents and the voltages of said system including a multipole magnetic member, and windings on said member connected to be energized by said currents and voltages in a predetermined order.

2. In combination, a polyphase alternating current system and an electroresponsive device comprising a movable member having an electric current conducting path, and means for controlling the movement of said member in accordance with the magnitudes of and the phase displacements between predetermined electric quantities of two groups of coexisting polyphase quantities derived from said system including a magnetic structure having a plurality of salients and providing relatively low reluctance paths between some of said salients, and windings on certain of said salients connected to be energized in a predetermined order by the electric quantities from one of said groups of polyphase quantities to produce a substantially zero torque effect on said movable member.

3. In combination, a three-phase alternating current system and a relay comprising a single rotatable current conducting member, and electromagnetic means for actuating said member in accordance with the magnitudes of and the phase displacements between the currents and the voltages of said system including a multipole magnetic member and windings thereon connected to be energized by said currents and voltages in a predetermined order, certain of said windings being energized by one kind of system electric quantities to produce on said rotatable current conducting member no torque dependent on only the one kind of quantities.

4. In combination, a polyphase alternating current system and an electroresponsive device comprising a single rotatable current conducting member and electromagnetic means for actuating said member in accordance with the magnitudes of and the phase displacements between predetermined electric quantities of two groups of coexisting polyphase quantities derived from said system including a multipole magnetic member and windings thereon connected to be energized by said quantities in a predetermined order, certain of said windings being energized by the quantities of one group in a predetermined order to produce by themselves alone substantially no torque on said conducting member.

5. In a combination, a polyphase alternating current system and an electroresponsive device comprising a single movable member having an electric current conducting path, and means for controlling the movement of said member in accordance with the magnitudes of and the phase displacements between predetermined electric quantities of two groups of coexisting polyphase quantities derived from said system including a magnetic member and windings thereon connected to be energized by said quantities in a predetermined order, certain of said windings being energized by the quantities of one group in a predetermined order to effect by themselves alone no movement of said movable member.

6. In combination, a polyphase alternating current system, an electrorespective device comprising a single rotor having a closed electric current conducting path, and means for actuating said member in accordance with the magnitudes of and the phase displacements between predetermined electric quantities of two groups of coexisting polyphase quantities derived from said system, including a magnetic member comprising a plurality of radially disposed salients having their extremities concentric with the conducting path of said rotor and windings on alternate salients connected to be energized in a predetermined order by the polyphase quantities of one group and windings on the remaining salients connected to be energized in a predetermined order by the polyphase quantities of the other group, the effect of each of said groups alone on said rotor being substantially nothing.

7. In combination, an $n$-phase system of alternating current quantities, a hollow magnetic stator having at least $2(n-1)$ inwardly projecting salients, a rotor having an electric current conducting path centrally positioned relatively to the inner ends of said salients, and means for establishing balanced torques on said rotor including windings on said salients connected to be energized in a predetermined order by the $n$-phase quantities of said system.

8. In combination, an $n$-phase system of alternating current quantities, a magnetic member having at least $2(n-1)$ radially disposed salients, a rotor having an electric current conducting path concentrically positioned relatively to the ends of said salients, and means for establishing balanced torques on said rotor including windings on said salients connected to be energized in a predetermined order by the $n$-phase quantities of said system.

9. In combination, an $n$-phase alternating current system, a hollow magnetic stator having $4(n-1)$ inwardly projecting salients, a rotor having an electric current conducting path centrally positioned relatively to the inner ends of said salients, windings on alternate salients connected to be energized in a predetermined order by one set of $n$-phase electric quantities of said system, and windings on the other salients connected to be energized by another set of $n$-phase electric quantities of said system, the resultant torque effect on said rotor of each set of windings being substantially nothing but the resultant torque effect of the windings on adjacent salients being dependent on the summation of the products of the quantities energizing adjacent salients and the angular displacement of said quantities.

10. In combination, an $n$-phase alternating current system and an electroresponsive device comprising a stator having $4(n-1)$ radially disposed salients, a rotor having an electric current conducting path concentrically positioned relatively to the ends of said salients, and means for producing a polyphase directional torque on said rotor including windings on alternate salients connected to be energized in a predetermined order by the currents in the phase conductors of the system, and windings on the other salients connected to be energized in a predetermined order by voltages of the system, the resultant torque effect on said rotor of each set of windings alone being substantially nothing.

11. In combination, an $n$-phase alternating current system, a magnetic member having at least $4(n-1)$ inwardly projecting salients, a rotor having an electric current conducting path concentrically positioned relatively to the ends of said salients, windings on alternate salients connected to be energized in a predetermined order by one set of $n$-phase electric quantities of said system and windings on the other salients connected to be energized by another set of $n$-phase electric quantities of said system, the resultant torque effect on said rotor of each set of windings being substantially nothing and the resultant torque effect of the windings on adjacent salients being dependent on the summation of the products of the quantities energizing adjacent poles and the angular displacements of said quantities.

12. In combination, a three-phase alternating current system, a hollow magnetic stator having eight inwardly projecting salients, a magnetic member centrally positioned relatively to and spaced from the inner ends of said salients, a rotor of electric current conducting material rotatably mounted for movement in the gaps between said centrally positioned magnetic member and the inner ends of the salients, windings on alternate salients connected to be energized in a predetermined order by the currents in the phase conductors of said system, and windings on the other salients connected to be energized in a predetermined order by the system voltages, the resultant torque effect on the rotor of each set of windings being substantially nothing and the resultant torque effect of the windings on adjacent salients being dependent on the summation of the products of the currents and the voltages energizing adjacent salients and the angular displacements of said currents and voltages.

13. In combination, two $n$-phase systems of alternating current quantities, a magnetic structure having an even number of salients, a rotatable current conducting member concentrically positioned relatively to the ends of said salients, windings on alternate salients energized in a predetermined order by the alternating current quantities of one of said $n$-phase systems to provide of themselves alone substantially no torque on said rotatable member, and windings on the other salients energized by the alternating current quantities of the other $n$-phase system.

14. In combination, two $n$-phase systems of alternating current quantities, a magnetic structure having an even number of salients, a rotatable current conducting member concentrically positioned relatively to the ends of said salients, windings on alternate salients energized in a predetermined order by the alternating current quantities of one of said $n$-phase systems to provide of themselves alone substantially no torque on said rotatable member, and windings on the other salients energized in a predetermined order by the alternating current quantities of the other $n$-phase system to provide of themselves alone substantially no torque on said rotatable member.

15. In combination, an $n$-phase system of alternating current quantities, a magnetic structure having a plurality of salients and providing relatively low reluctance paths between some of said salients, a rotatable electric current conducting member concentrically positioned relatively to the ends of said salients, and windings on said salients energized in a predetermined order by the alternating current quantities of said $n$-phase system to provide substantially no torque on said rotatable member.

16. In combination, two polyphase systems of alternating current quantities and a device comprising a movable member, and means for controlling the movement of said member in accordance with a predetermined function of the quantities of both of said systems including a magnetic structure having a plurality of salients and providing relatively low reluctance paths between some of said salients, and windings on said salients, certain of said windings being connected to be energized in a predetermined order by electric quantities of one of said polyphase systems to produce of themselves alone a substantially zero torque effect on said movable member.

17. In combination with a three-phase alternating current system and a relay comprising a single rotatable current conducting member, electromagnetic means for actuating said member in accordance with a component of the polyphase power of the system, including a multipole magnetic member and windings thereon connected to be energized by the currents and the voltages of the system in a predetermined order.

18. In combination, two polyphase systems of alternating current quantities and a relay comprising a single rotatable current conducting member, electromagnetic means for actuating said member in accordance with a predetermined function of the magnitudes of and the phase displacements between the quantities of said two systems including a multipole magnetic member and windings thereon connected to be energized by the quantities of said two systems in a predetermined order.

19. In combination, two polyphase systems of alternating current quantities, an electroresponsive device comprising a movable current conducting member and electromagnetic means for controlling the movement of said member in accordance with the magnitudes of and the phase displacements between predetermined electric quantities of said two polyphase systems including a magnetic member having a plurality of salients all of which are disposed on one side of said movable current conducting member, windings on certain of said salients connected to be energized in a predetermined order by the electric quantities from one of said systems of polyphase quantities to produce a substantially zero torque effect on said movable current conducting member and windings on others of said salients connected to be energized in a predetermined order by electric quantities from the other of said systems, the resultant torque effect of said windings being dependent on the summation of the products of the electric quantities energizing the salients and the angular displacements of said quantities.

20. In combination, an $n$-phase alternating current electric system, a rotatable electric current conducting member, a magnetic structure having a plurality of salients all disposed on one side of said rotatable member, and windings on said salients energized in a predetermined order by electric quantities of two groups of coexisting polyphase quantities derived from said $n$-phase system to provide a torque on said rotatable member dependent on the magnitudes of and the phase displacements between said quantities, the windings on certain of said salients being energized in a predetermined order by the quantities of one group to produce a substantially zero torque effect on said rotatable member.

DAVID C. PRINCE.